US012792982B2

(12) United States Patent
St. Pierre et al.

(10) Patent No.: US 12,792,982 B2
(45) Date of Patent: Nov. 10, 2026

(54) TASK WORKFLOW MODELING INTERFACE

(71) Applicant: Oracle International Corporation, Redwood Shores, CA (US)

(72) Inventors: Robert St. Pierre, Campbell, CA (US); Mark Pearson, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 471 days.

(21) Appl. No.: 18/343,612

(22) Filed: Jun. 28, 2023

(65) Prior Publication Data

US 2024/0127144 A1 Apr. 18, 2024

Related U.S. Application Data

(60) Provisional application No. 63/416,504, filed on Oct. 15, 2022.

(51) Int. Cl.
*G06Q 10/0633* (2023.01)
*G06N 20/00* (2019.01)
(Continued)

(52) U.S. Cl.
CPC ..... *G06Q 10/063112* (2013.01); *G06N 20/00* (2019.01); *G06Q 10/063114* (2013.01);
(Continued)

(58) Field of Classification Search
CPC ............ G06Q 10/20; G06Q 10/06398; G06Q 10/0633; G06Q 10/063116; G06Q 10/063114; G06Q 10/063112; G06N 20/00
See application file for complete search history.

(56) References Cited

U.S. PATENT DOCUMENTS 6,336,053 B1 1/2002 Beatty
8,548,838 B1 10/2013 Ganesan
(Continued)

OTHER PUBLICATIONS

"Application Help for SAP Manufacturing Execution", Retrieved from https://help.sap.com/docs/SAP_MANUFACTURING_EXECUTION/e1adc70af32241619335c8768a892edb/04510820335f4e129df327de58689a22.html, Jan. 3, 2023, pp. 43.
(Continued)

*Primary Examiner* — Deirdre D Hatcher
(74) *Attorney, Agent, or Firm* — Invoke

(57) ABSTRACT

Techniques for generating recommendations for re-ordering scheduled tasks to improve completion times of one or more tasks are disclosed. A system displays a representation of a schedule for performing tasks among work centers in a work environment. The system identifies performance metrics associated with a current configuration of tasks in the work environment. The system further analyzes performance metrics for alternative task schedules in the work environment. The system displays interface elements to allow a user to re-order tasks among the work centers in the work environment. The system also displays predicted performance metrics associated with the alternative task schedules. When a user selects a particular interface element to implement an alternative task schedule, the system generates instructions to work centers to reorder tasks in the work environment.

21 Claims, 9 Drawing Sheets

(51) Int. Cl.
*G06Q 10/0631* (2023.01)
*G06Q 10/0639* (2023.01)
*G06Q 10/20* (2023.01)

(52) U.S. Cl.
CPC . *G06Q 10/063116* (2013.01); *G06Q 10/0633* (2013.01); *G06Q 10/06398* (2013.01); *G06Q 10/20* (2013.01)

(56) References Cited

U.S. PATENT DOCUMENTS

| | | | | |
|---|---|---|---|---|
| 11,853,935 | B2 * | 12/2023 | Volkov | G06Q 10/063116 |
| 2005/0154625 | A1 * | 7/2005 | Chua | G06Q 10/06 700/100 |
| 2008/0078834 | A1 | 4/2008 | Woodward | |
| 2008/0183538 | A1 | 7/2008 | Hamadi et al. | |
| 2011/0271220 | A1 * | 11/2011 | Remsberg | G06Q 10/06 715/772 |
| 2014/0277596 | A1 | 9/2014 | Nixon et al. | |
| 2015/0199641 | A1 * | 7/2015 | Napoli | G06Q 10/063114 705/7.15 |
| 2018/0139273 | A1 * | 5/2018 | Liu | H04L 67/1021 |
| 2019/0197475 | A1 * | 6/2019 | Bianconcini | G05D 1/0287 |
| 2019/0213509 | A1 | 7/2019 | Burleson et al. | |
| 2021/0264202 | A1 * | 8/2021 | Kalluri | G06Q 10/0633 |
| 2021/0280287 | A1 * | 9/2021 | Mahmood | G16H 10/60 |
| 2022/0147906 | A1 * | 5/2022 | Kuwahara | G06Q 50/04 |
| 2023/0094381 | A1 * | 3/2023 | Meghani | G06N 3/092 705/7.22 |

OTHER PUBLICATIONS

"How to Set Up and Use the SAP ME Assembly Feature", Version 1.3, Mar. 2012, pp. 37.

"Labor Management for Semiconductor", Retrieved from https://www.plm.automation.siemens.com/global/en/products/manufacturing%E2%80%90operations/labor%E2%80%90management%E2%80%90for%E2%80%90semiconductor.html, Retrieved on Jan. 3, 2023, pp. 4.

"Labor Management", Retrieved from https://metasmartfactory.com/labor-management/, Retrieved on Jan. 3, 2023, pp. 4.

"Manufacturing Execution System", Siemens Software, Retrieved from https://plm.sw.siemens.com/en-US/opcenter/manufacturing-execution-system-mes-capabilities/, Retrieved on Jan. 3, 2023, pp. 7.

"Production Planning, Scheduling, and Management Software", Retrieved from https://www.plex.com/products/manufacturing-execution-system/production-planning-scheduling-and-management-software, Retrieved on Jan. 3, 2023, pp. 1-4.

"Using the Work Center UI Form", Retrieved from https://docs.infor.com/factorytrack/6.01/enus/ftslolh/csj1463472759920.html, Retrieved on Jan. 3, 2023, pp. 1-4.

Tropschuh et al., "Activity-based shop floor management—A concept to enhance flexibility", Conference on Production Systems and Logistics CPSL, 2020, pp. 259-268.

* cited by examiner

TASK WORKFLOW MODELING INTERFACE

INCORPORATION BY REFERENCE; DISCLAIMER

The following application is hereby incorporated by reference: application no. 63/416,504, filed Oct. 15, 2022. The applicant hereby rescinds any disclaimer of claims scope in the parent application(s) or the prosecution history thereof and advise the USPTO that the claims in the application may be broader than any claim in the parent application(s).

TECHNICAL FIELD

The present disclosure relates to work center resource network integration. In particular, the present disclosure relates to operations and user interfaces for reordering sets of tasks in a work center.

BACKGROUND

In physical facilities, such as manufacturing plants, workers at many different work stations interact with equipment to perform tasks on materials, such as product components. Many different events may result in sub-optimal performance of a manufacturing facility. For example, a drop in a worker's productivity may result in delays to subsequent tasks and failure to deliver products on time. Equipment breakdown may take a work center out of action for a time, resulting in delays to any tasks that rely on the work center. Tracking multiple different performance metrics across the manufacturing facility may be a complex data gathering and analysis process. Identifying a source of a problem—whether a fault or a failure to meet specified performance metrics—can be even more challenging. Determining how to re-order tasks performed by workers to improve performance metrics based on the identified problems adds yet another layer of complexity. A task manager may not have a clear idea of how rearranging tasks will affect other tasks, or how effective the changes would be to improve performance metrics the task manager is most concerned about. For example, if a machine breaks down, a task manager can send materials to another work center to have another worker perform a task. However, the task manager may not be able to predict how effective the change would be to overall equipment utilization, worker utilization, or on-time deliveries. The task manager may also not be able to predict the repercussions a task reordering may have on additional tasks at other work centers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
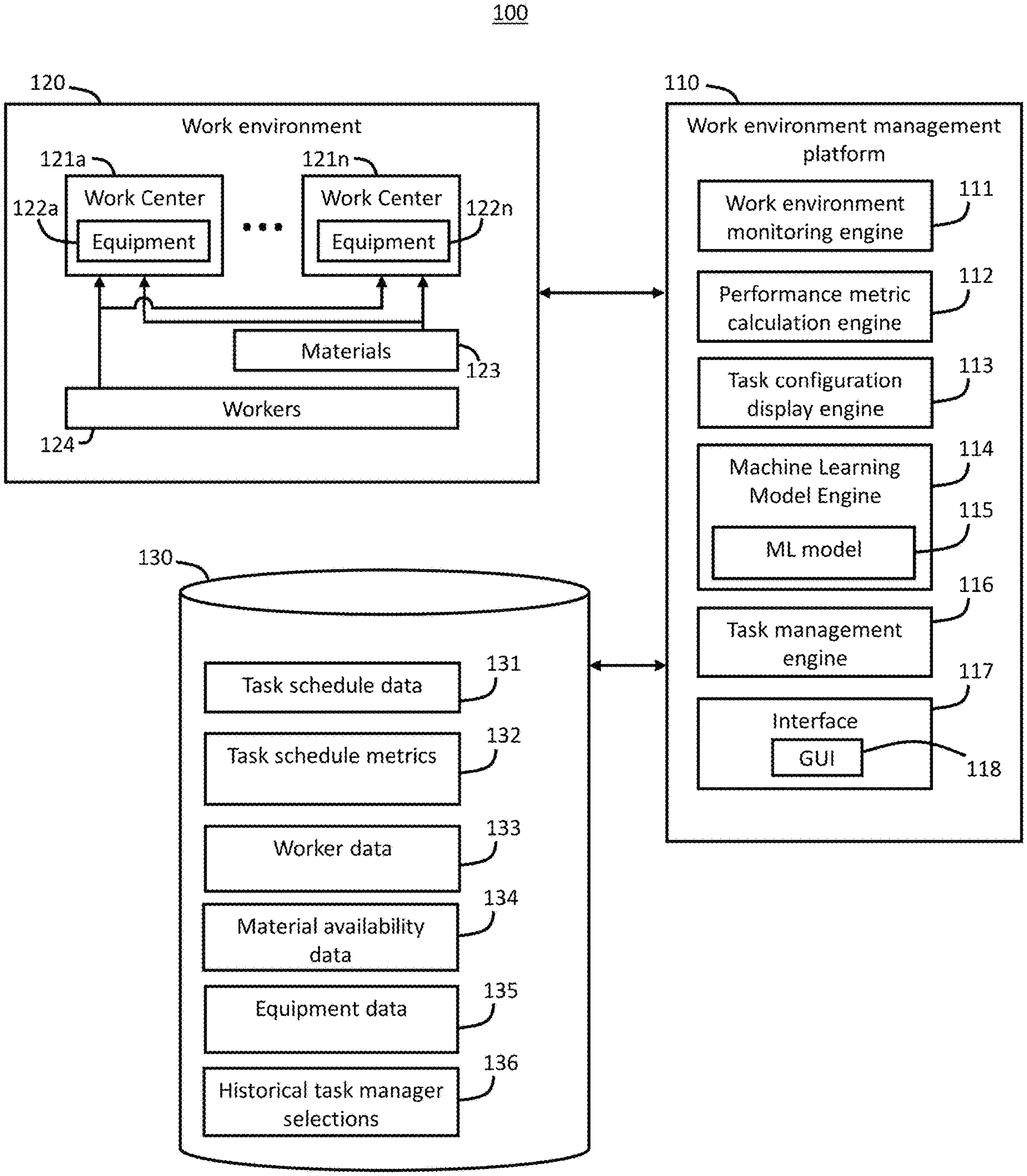
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. REORDERING WORK CENTER TASKS
4. TRAINING A MACHINE LEARNING MODEL
5. EXAMPLE EMBODIMENT
6. PRACTICAL APPLICATIONS, ADVANTAGES, AND IMPROVEMENTS
7. COMPUTER NETWORKS AND CLOUD NETWORKS
8. MISCELLANEOUS; EXTENSIONS
9. HARDWARE OVERVIEW

1. General Overview

One or more embodiments illustrate the flow of components through a set of work centers that are used for performing tasks associated with components. The work centers may be represented with interface elements that are positioned within a representation of the environment in which the work centers are located.

One or more embodiments generate recommendations for re-ordering scheduled tasks to improve completion times of one or more tasks. For example, a system may provide two options for rescheduling tasks to improve completion times. According to option 1, the system reschedules tasks by pulling in orders from another day. According to option 2, the system reschedules tasks by offloading tasks to alternate work centers. A user may select, in a graphical user interface (GUI), a tile associated with an option to see how the option would affect the scheduled tasks among all the work centers. In addition, the user may further customize the rescheduling of tasks by selecting and moving individual tasks and sets of tasks in the task scheduling display region of the GUI display.

When an error is detected in relation to a particular work center, the system identifies the set of components that were accessed, modified, or otherwise related to tasks performed by the particular work center. The system may visually identify (a) other work centers related to that set of components, (b) work centers currently performing tasks associated with that components, and/or (c) a current location of that set of components. The system may provide the recommendations for re-ordering scheduled tasks based on the detected error and affected machines, materials, and users.

One or more embodiments apply a trained machine learning model to a set of candidate alternate task schedules to select a subset of alternate task schedules to recommend to a user for implementation in a work environment. Different candidate schedules may correspond to different performance metric gains and costs. According to one or more embodiments, the system trains the machine learning model on historical user selections of task configurations to learn relationships among performance metrics, costs, time (such as seasonal conditions), and whether a user selected or refrained from selecting a candidate task schedule for implementation in the work environment.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a work environment management platform 110 and a data repository 130. The work environment management platform 110 monitors and manages operations in a work environment 120. As an example, a work environment may be a manufacturing facility. The facility includes work centers 121*a*-121*n*. Each work center includes a set of equipment 122*a*-122*n*. One work center may be a component assembly work center. At a component assembly work center, workers may assemble components from materials 123. Components assembled at one work center may be the materials required to perform additional tasks at another work center. Another work center may be a component testing work center. Another work center may be a quality assurance work center. One or more workers 124 may be assigned to work at a particular work center 121*a*-121*n*. When a worker 124 logs in to a terminal at a work center, the terminal identifies the tasks to be performed by the worker 124. The terminal may further grant and deny access to equipment 122*a*-122*n* at the work center, according to the worker's assigned tasks and authorization level.

According to one or more embodiments, the work environment 120 includes work centers 121*a*-121*n* associated with various pieces of equipment 122*a*-122*n*. A work center may include a user terminal, testing equipment, manufacturing equipment (e.g., saws, drills, etc.) or any other equipment for manufacturing, assembling, and testing components. Different types of equipment require different qualifications for workers 124 to handle the equipment. One or more embodiments analyze worker qualifications to manage the worker's access to equipment associated with a work center.

In an embodiment, the work environment management platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

The work environment management platform 110 includes a work environment monitoring engine 111 to monitor attributes of the work environment 120. The work environment monitoring engine 111 may monitor worker status data, equipment status data, materials status data, and other work environment data. Monitoring worker status data may include detecting a worker log in/log out, detecting a selection by a worker at a work center terminal to being or pause a task or indicate a particular task has been completed, and detecting notifications requesting particular workers at particular work centers in the work environment 120. Monitoring equipment status data may include monitoring whether a piece of equipment is operational or out of service (e.g., in a fault state), monitoring a calibration status of equipment, and monitoring whether equipment is in use and for how long. Monitoring materials data may include detecting a location of materials in the work environment 120 and detecting a quantity of materials available in the work environment.

A performance metric calculation engine 112 calculates performance metrics for the work environment (e.g., task schedule metrics 132) based on the work environment data obtained by the work environment monitoring engine 111. For example, the performance metric calculation engine 112 may analyze equipment status data 135 to calculate a utilization rate—or a percentage of time that a piece of equipment is in use—for a particular work center and/or across the entire work environment 130. The performance metric calculation engine 112 may analyze worker data 133, equipment data 135, and materials data 134 to calculate task completion times for particular tasks. The performance metric calculation engine 112 may analyze worker data 133, equipment data 135, and materials data 134 to calculate on-time delivery statistics, efficiency statistics, cost-estimate statistics, and/or overall equipment effectiveness (OEE) statistics for a worker, work center, and/or the work environment.

According to one or more embodiments, a manager or administrator accesses the work environment management platform 110 via an interface 117 to view attributes of the work environment via a graphical user interface (GUI) 117. In one or more embodiments, interface 117 refers to hardware and/or software configured to facilitate communications between a user and the work environment management platform 110. Interface 117 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 117 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 117 is specified in one or more other languages, such as Java, C, or C++.

According to one embodiment, the work environment platform 110 displays a geographical representation of a work environment in the GUI 118. The work environment platform 110 may overlay visual elements representing performance metrics on top of regions in the geographical representation of the work environment. For example, the work environment management platform 110 may display in the GUI 118 boxes representing locations in a manufacturing facility corresponding to separate work centers. The platform 110 may overlay, onto the boxes, icons representing a particular numerical value representing the value of the performance metric associated with the work center. For example, a work center characterized by a 95% efficiency level may be overlaid by a relatively long column icon or a green icon. A work center character characterized by a 50% efficiency level may be overlaid by a relatively short column icon or a red icon.

A task configuration display engine 113 generates task schedule data 131 to display a configuration of tasks for a task schedule in the GUI 118. The configuration of tasks may include sets of tasks, arranged in sequence, scheduled to be performed at a respective set of work centers. According to one embodiment, the configuration of tasks is displayed as a Gantt chart.

A machine learning engine 114 trains a machine learning model 115 to generate recommendations for one or more alternate task schedules. In some examples, one or more elements of the machine learning engine 114 may use a machine learning algorithm to train the machine learning model 115 using historical task manager selections 136 of alternate task schedules. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging, random forest, boosting, back-propagation, and/or clustering.

In an embodiment, a set of training data includes datasets and associated labels. The datasets are associated with input variables (e.g., whether a particular alternate task schedule was selected or not selected by a user for implementation, performance metrics of the selected and unselected alternate task schedules, costs associated with alternate task schedules, temporal data associated with alternate task schedules) for the target model f. The associated labels are associated with the output variable (e.g., whether to include a particular alternate task schedule among a set of recommended alternate task schedules) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

A task management engine 116 generates instructions to modify sets of tasks assigned to work centers 121*a*-122*n* and/or workers 124. For example, a work center may display for a worker a set of tasks to be performed at the work center. Based on a task manager selection to modify a task schedule of tasks to be performed among work centers, the task management engine 116 generates instructions to move a set of tasks from one particular work center to a different work center. Alternatively, the task management engine 116 may generate instructions to move a set of tasks in a schedule from a later designated time to be performed to an earlier designated time at the same work center.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 7, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may be executed on the same computing system as the work environment management platform 110. Alternatively, or additionally, a data repository 130 may be implemented or executed on a computing system separate from the work environment management platform 110. A data repository 130 may be communicatively coupled to the work environment management platform 110 via a direct connection or via a network.

Information describing task schedule data 131, task schedule metrics 132, worker data 133, material availability data 134, equipment data 135, and historical task manager selections 136 of alternate task schedules may be implemented across any of components within the system 100. However, this information is illustrated within the data repository 130 for purposes of clarity and explanation.

In one or more embodiments, the work environment management platform 110 refers to hardware and/or software configured to perform operations described herein for recommending and implementing task schedules for a work environment. Examples of operations for recommending and implementing task schedules for a work environment are described below with reference to FIG. 2.

3. Task Workflow Modeling

Figure 2:
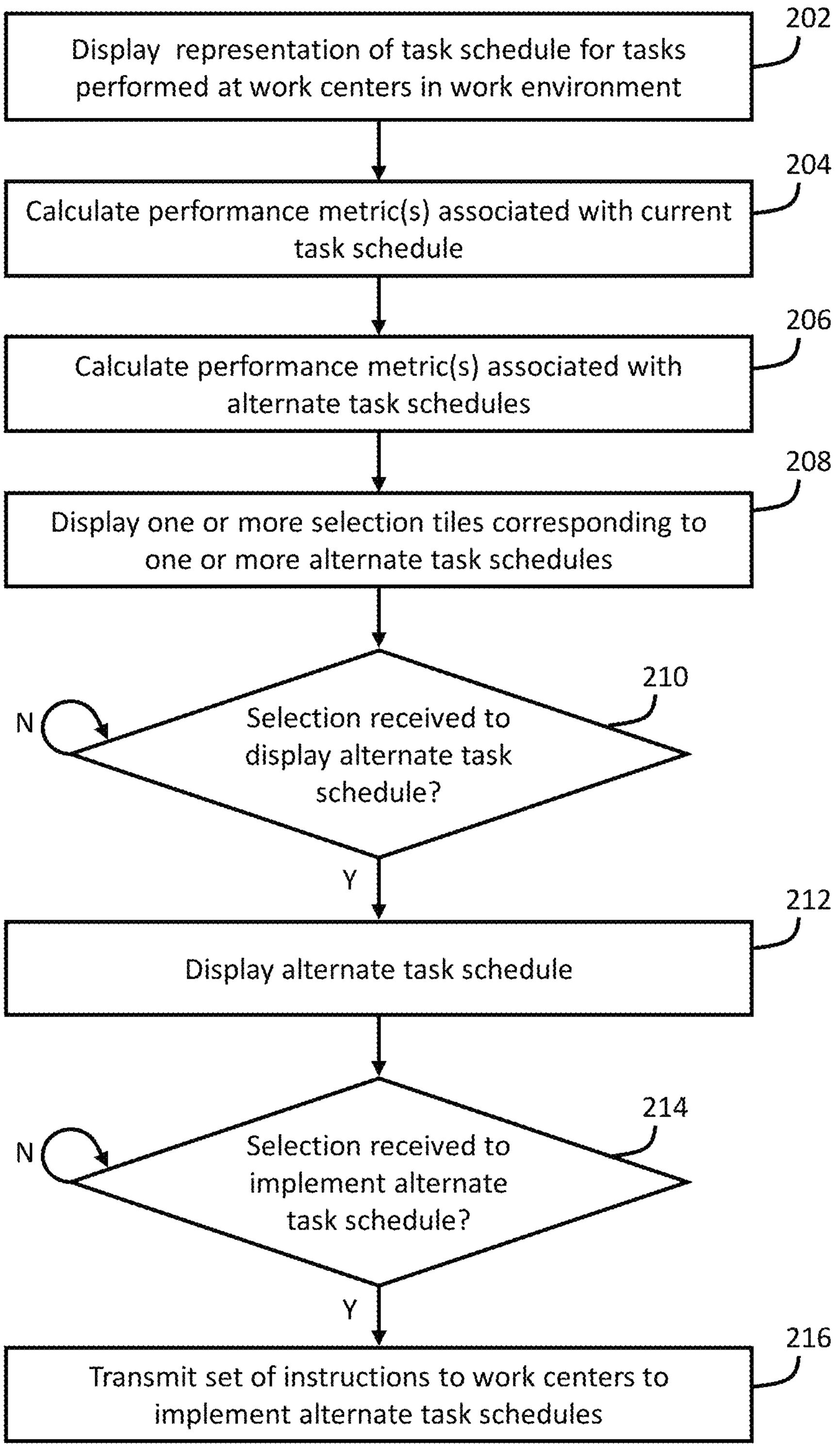
FIG. 2 illustrates an example set of operations for multi-layer forecasting of computational workloads in accordance with one or more embodiments.

FIG. 2 illustrates an example set of operations for reordering of work center tasks in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system displays a representation of a configuration for performing a set of tasks at work centers in a work environment (e.g., a "task schedule") (Operation 202). The task schedule may be displayed in a graphical user interface (GUI) of a display device. The task schedule may include, for example, (a) rows corresponding to particular work centers, and (b) interface elements, such as rectangles, in the rows, representing tasks performed at the work centers. For example, a sequence of ten rectangles arranged in the same row may represent a sequence of ten tasks performed at a work center. According to one embodiment, the task schedule is displayed as a Gantt chart. The system calculates time to complete tasks, and the corresponding length of an interface element representing the task, based on (a) characteristics of equipment at a work center, (b) characteristics of materials required to perform the task, and (c) characteristics of workers at the work center.

Characteristics of equipment include: a type of equipment (such as a model of equipment), whether the equipment is specifically intended for a particular task, a current configuration of equipment (e.g., does a piece of equipment need to be adjusted or calibrated to perform a task), an estimated likelihood that the equipment will perform the task without failing, and a maintenance status of the equipment. Characteristics of materials include: a location of materials in a work environment (e.g., do materials need to be delivered to equipment for performing a task, or are they already located at the work center?), a type of material, historical availability of the materials, and a number of work centers and/or tasks requiring the materials. Characteristics of workers include: qualifications of workers to operate equipment and/or handle materials, experience levels of workers, historical efficiency and productivity of workers, and authorization levels of workers.

The system calculates the time required to complete tasks based on combinations of (a) characteristics of equipment at a work center, (b) characteristics of materials required to perform the task, and (c) characteristics of workers at the work center. For example, the system may calculate the same task, such as manufacturing a component, may take longer at one work center than another, based on (a) a time it may take to deliver materials to one work center compared to another, (b) a time it takes to calibrate equipment at a particular work center compared to performing the task at another work center, (c) an experience level of workers at different work centers, (d) delays resulting from congestion in a work environment resulting from moving materials and/or workers between work centers, and/or (e) a type of equipment at one work center corresponding to a higher likelihood of failure (e.g., older equipment, or equipment having higher failure rates) than at another work center. As another example, the system may calculate the same task may take longer for one worker to perform at a work center compared to another worker, based on past performance of the workers, based on skill levels, and/or based on authorization levels (e.g., one worker may require supervisor approval to complete a task, while another may not).

According to one embodiment, the calculation of the time required to complete a task is performed by a machine learning model trained on historical data regarding (a) characteristics of equipment at work centers, (b) characteristics of materials required to perform tasks, and (c) characteristics of workers at work centers.

According to one or more embodiments, the system displays the task schedule responsive to a user interaction with another representation. For example, the system may first display a representation of a work environment, such as a factory. The system may display a work center in the work environment at which a fault has been detected. The system may further display additional work centers related to the fault. For example, the system may display: (a) work centers that rely on materials output from tasks performed at the "fault" work center, and/or (b) work centers that provide materials to the "fault" work center. As an example, the system may identify the "fault" work center and one or more "root cause" work centers that are likely to be the cause of the fault. For example, a broken piece of equipment at the "fault" work center may be caused by a mis-configured piece of equipment at an upstream work center generating materials that do not meet a required specification. A user may interact with representations of work centers in a GUI to cause the system to modify the display from a representation of the work environment to the representation of the task schedule, showing which tasks are scheduled to be performed at different work centers for a particular period of time.

According to another example, the system may initially display a work environment with graphical depictions of one or more performance metrics. For example, each work center in the work environment may be displayed together with a respective icon representing a performance metric, such as efficiency, utilization rates of equipment and/or workers, and on-time performance of tasks. A user may interact with representations of work centers in the GUI to cause the system to modify the display from a representation of the work environment to the representation of the task schedule.

The system calculates one or more performance metrics associated with a current task schedule (Operation 204). One set of performance metrics may include overall metrics for an entire work environment. Another set of performance metrics may include metrics for sub-divisions, such as a work group within a work environment, a team of workers operating in the work environment, geographic regions within the work environment (e.g., an environment included four sets of ten separate work centers), individual work centers within the work environment, and workers within the work environment.

Examples of performance metrics include: utilization (e.g., a percentage of time that a work center, or a user/equipment combination, is in use), efficiency (e.g., a rate at which a work center (or a worker/equipment combination at the work center) completes tasks), overall equipment effectiveness (OEE) (e.g., a metric combining a percentage of time a work center is in use, a rate at which the work center corresponds to completed tasks, and a quality of materials or components output from the work center), on-time performance (e.g., a percentage of tasks completed on-time). A system may calculate combinations of environment-wide and work-center-specific performance metrics. For example, the system may calculate the on-time deliveries of products resulting from all the work centers in the work environment. The system may also calculate the percentage of tasks that are completed on-schedule at the respective work centers in the work environment.

According to one example embodiment, the system detects a fault within a work environment. A fault may correspond to any state in which a work center is unable to perform tasks—either at all, or at least according to a specified performance threshold. Faults may include: a worker unavailable to operate equipment at a work center, materials unavailable for use at a work center, and equipment malfunctioning at a work center. In this example, the system calculates performance metrics for work centers and/or the work environment in which the fault has been detected. According to another example, the system may calculate performance metrics for work centers and/or a work environment in which no fault has been detected.

The system further calculates performance metric estimates associated with one or more alternate task schedules in the work environment (Operation 206). For example, the system may calculate a work environment's utilization percentage, overall monetary costs to complete tasks, and/or OEE in alternate task schedules in which (a) tasks are re-ordered, within the same work center, from one day to another day, (b) tasks are re-ordered between two different work centers within the same work day or shift, (c) tasks are assigned to different workers at the same or different work centers, and/or (d) equipment is moved from work center to another work center. The system selects alternate task schedules based on predefined criteria. For example, the system may prioritize reordering and rearranging tasks for work centers where a fault is detected. The system may next prioritize reordering and rearranging tasks for work centers identified as being a root cause of a downstream fault. The system may next prioritize reordering and rearranging tasks for work centers that do not meet a performance metric threshold, but where no fault has been detected.

Calculating performance metric estimates associated with alternate task schedules includes identifying worker attributes, such as a worker identification, worker qualifications, worker experience, and worker availability. The system may identify work center attributes including types of equipment, a maintenance status of the equipment (e.g., will it be due for maintenance soon, is it overdue for maintenance, or is it up-to-date with maintenance), and a time required to transfer materials for tasks to the work. The system may identify traffic or congestion within a work environment which could cause delays in changing from a current configuration for performing tasks to a different configuration as an input feature to the model. For example, one estimate may be calculated based on determining that a set of tasks may be transferred, within a same day, from one worker at one work center, to another worker at another work center. The system may identify work center attributes including the suitability of the equipment at the target work center to perform the tasks. The system may identify worker attributes including a higher efficiency of the target worker in performing the tasks than the source worker. The system may identify material characteristics, including a time required to transfer materials for performing the tasks from one work center to another work center.

According to one or more embodiments, the system calculates performance metric estimates based on a model of the work environment. The system may train an estimate-generation model based on historical work environment data to predict performance metrics for different task schedules. The estimate-generation model may include an algorithm including elements for work center attributes, worker attributes, material attributes, equipment attributes, and task attributes. The system may train the algorithm to learn, for different sets of input attributes, corresponding performance metrics.

The system displays one or more alternative-task-schedule selection tiles corresponding to the alternative task schedule(s) (Operation 208). The system may display a representation of a work environment in one region of a graphical user interface and the task-schedule-selection tiles in another region. For example, the task-schedule-selection tiles may be located above, below, or to a side of the representation of the work environment. The system may apply a trained machine learning model to determine which task-schedule-selection tiles to display. Input features for the machine learning model include historical task manager selections associated with different configurations of tasks performed by workers at work centers.

For example, the system may learn that task managers select alternative task schedules prioritizing a work center utilization performance metric over an on-time delivery performance metric. The system may learn that task managers generally do not select alternative task schedules that provide less than a 5% increase in an OEE performance metric, or that provide more than a 3% increase in financial cost to perform the tasks.

According to one example, a system may identify a first alternative task schedule in which the system estimates the reconfiguration of tasks would result in an OEE performance metric improvement of 10%. The system may determine that the reconfiguration would not result in an increase in financial cost. The system may determine that the workers required to perform the tasks are already available and would not be required to work overtime. The system may identify a second alternative task schedule in which the system estimates the task reconfiguration would result in an OEE performance metric improvement of 20%. The system may determine that the second alternative task schedule would result in an increase in costs by 5%, indicating one or more workers would be paid overtime, or one or more workers would be required to work when they otherwise would not be working. The system (such as the trained machine learning model) may learn from historical selections of a task manager that the system should display a tile representing the first alternative task schedule, and not the second alternative task schedule. The system may further identify that a second tile associated with a second alternative task schedule and a second performance metric should also be displayed.

According to one example, the system learns task manager selection patterns associated with temporal seasons or time periods. For example, the system may learn that towards the end of a fiscal quarter, a task manager is more likely to select an option with a lower cost/lower performance metric gain when given the option with the lower cost/lower gain and another option with a higher cost and a higher performance metric gain. The system may further learn that towards the beginning of a fiscal quarter, a task manager is more likely to select an option with a higher cost/higher performance metric gain when given the same set of options (e.g., one option with lower cost/lower gain and another option with higher cost/higher gain). Accordingly, for a same underlying set of work environment conditions (e.g., the same set of tasks to be performed among the same sets of workers and equipment), the system may display one set of alternative task schedule tiles when the conditions occur at one point in a fiscal quarter and a different set of alternative task schedule tiles when the conditions occur at a different point in the fiscal quarter.

In addition, a trained machine learning model may determine a number and order of alternative task-schedule-selection tiles to be displayed. The model may learn that the system should only display tiles associated with alternate task schedules when a performance metric improvement exceeds a threshold, or when a cost to achieve a performance metric improvement is less than a threshold. Accordingly, for one set of work environment conditions, the system may display no tiles associated with alternate task schedules. For another set of work environment conditions, the system may display only one option for an alternate task schedule. For yet another set of work environment conditions, the system may display up to four tiles associated with alternate task schedules.

According to one or more embodiments, the system analyzes both benefits and costs associated with task performance reconfigurations when determining whether to display a tile associated with an alternative task schedule. As discussed above, benefits include improvements to performance metrics. Costs may include financial costs, delays in one or more workflows resulting from re-arranging tasks in other workflows (for example, improving an efficiency in one work center resulting in on-time delivery may result in a delay in another work center, resulting in a late delivery), work environment congestion, and deviation from normal or specified best practices.

The system detects a selection corresponding to one of the alternate task schedules (Operation 210). For example, a user may interact with a user interface element in a GUI to indicate selection of the alternate task schedule.

Responsive to detecting a selection, the system modifies a GUI to display the reordering of tasks among work centers corresponding to the selection (Operation 212). The system may display a Gantt chart with rows representing work centers and line segments or rectangles along the rows representing tasks to be completed at the work centers. The system may display a set of tasks in a source work center with a first set of display characteristics to distinguish among (a) tasks that would be unchanged (i.e., performed at a same time in a same work center) in both the source task configuration and the target task configuration, and (b) tasks that would be modified (i.e., performed at a different time, at a different work center, or both) in the target task configuration.

For example, the system may show a set of tasks that would be modified between a source configuration and a target configuration as (a) greyed out boxes in a source work center row at a source time, and (b) highlighted boxes at a target work center row at a target time. The system may alter the appearance of tasks in a representation of a target configuration to indicate a change in task characteristics. For example, moving a set of tasks from one work center to another may result in the tasks taking longer to perform in the target work center. The system may lengthen a visual representation of the tasks in the target work center to indicate the estimate for the difference in time required to perform the tasks between the source work center/time and the target work center/time. In addition, or in the alternative, moving a set of tasks from one work center to another may result in the tasks taking a shorter amount of time to complete in the target work center. The system may shorten a visual representation of the tasks in the target work center to indicate the estimate for the difference in time required to perform the tasks between the source work center/time and the target work center/time. The visual depictions of a difference in time required to complete tasks in an alternate task schedule may include visual representations of graphical elements without corresponding text. Alternatively, the visual representations may include text indicating a change in time required to complete tasks.

Moving tasks from one work center to another may require lead time to reconfigure equipment at a target work center. Accordingly, the system may display an additional task in a portion of the GUI representing the target work center corresponding to a time required to calibrate equipment at the target work center to perform the tasks. When moving tasks from a source work center to a target work center, another set of tasks may be bumped from the target work center. The system may further display the rescheduling of tasks from the target work center to another time at the same work center, or to a different work center altogether. The system may visually highlight any tasks in the representation of the target task schedule that are modified from the source task schedule.

Moving tasks from one work center to another may require redirecting materials from a source work center to a target work center. Redirecting the materials may result in congestion within a work environment. Accordingly, the system may modify a start time of tasks in the target work center to account for a delay caused by the predicted congestion in the work environment. In addition, the system may display in a visual representation of the work environment in the GUI, a depiction of a location of the predicted congestion.

The system detects a selection to implement an alternate task schedule (Operation 214). For example, upon modifying a display in a GUI from a work environment representation to a task schedule representation (Operation 212), the system may further display an interface element in the GUI to allow a user to select an alternative task schedule for implementation. In one or more embodiments, the interface element is a confirmation icon which is selectable by a user.

Based on receiving the selection to implement the alternative task schedule, the system generates and transmits instructions to work centers to implement the alternative task schedule (Operation 216). Generating instructions to implement the alternative task schedule includes modifying sets of tasks assigned to workers at workstations. For example, when a set of tasks is moved from a first work center to a second work center, the system removes a set of tasks from a queue of tasks to be performed by one or more workers at the first work center and adds the set of tasks to a queue of tasks to be performed by one or more workers at the second work center. If the worker(s) at the second work center had other tasks previously assigned to them, the other tasks may be either rescheduled to different times for the same worker(s) or transferred to another worker at another work center.

According to one or more embodiments, when a worker logs in to a work center terminal, the terminal identifies a set of pending tasks that need to be completed. Each particular pending task of the set of pending tasks may be completed by any worker, of a set of workers, with the qualifications to complete the particular pending task. When a particular worker logs into the work center, the system analyzes the qualifications of the particular worker to determine and present a subset of the set of pending tasks that can be performed by the worker. When the system modifies a task schedule in response to the selection of the alternative task schedule in the GUI, the system modifies the set of available tasks at the work center accordingly. For example, prior to the task schedule modification, there may be a first set of pending tasks that may be assigned to a worker. Subsequent to the task schedule modification, there may be a second set of pending tasks that may be assigned to the worker. The system assigns the next task in a sequence of tasks indicated in the task schedule to the worker.

In a particular work environment, generating and transmitting instructions to work centers to modify a task schedule may include generating and transmitting instructions to: direct workers to transfer materials from one work center to another, allow access by a worker at a work center to a particular material available at the work center, direct a worker to configure a piece of equipment at a work center to perform a particular task, direct a worker to perform maintenance on a piece of equipment, direct a worker to perform a particular task on a set of materials at a work center to produce a product (which may be a component for use in another task at another work center or at the same work center), direct a worker to refrain from performing a previously-scheduled task, and direct a worker to assist another worker in performing a task.

4. Training a Machine Learning Model

Figure 3:
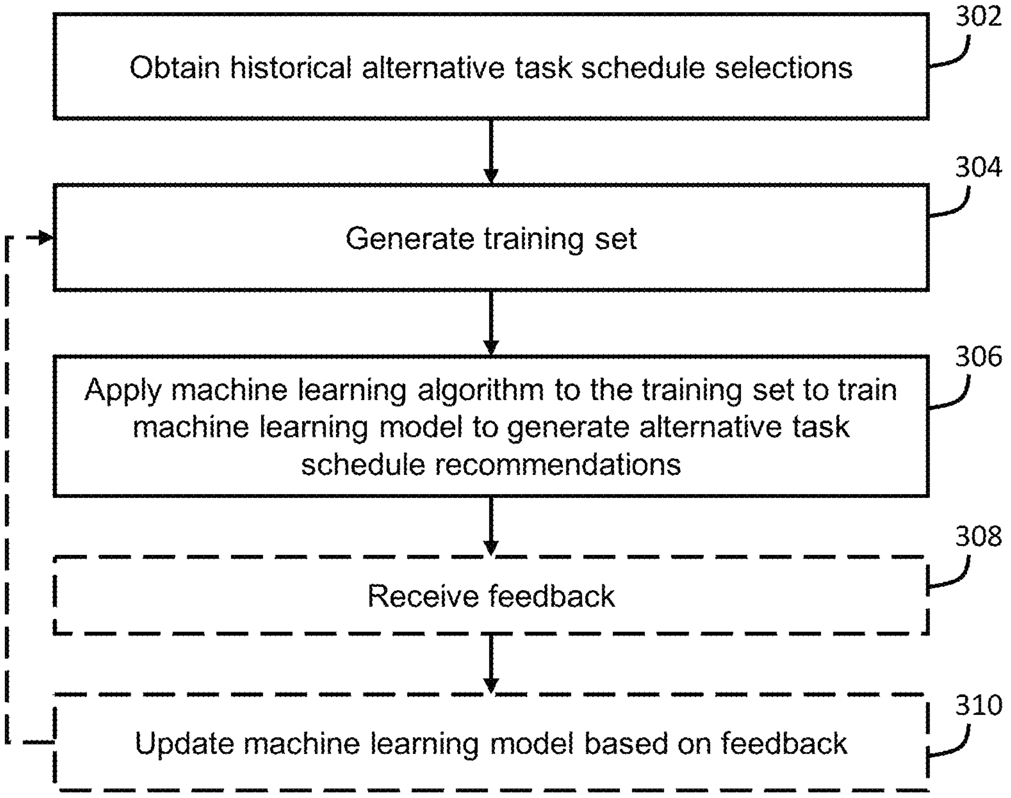
FIG. 3 illustrates an example set of operations for training a machine learning model to recommend alternate task schedules in accordance with one or more embodiments

FIG. 3 illustrates an example set of operations for training a machine learning model to generate recommendations for alternative task schedules, in accordance with one or more embodiments. A system obtains historical task schedule configurations (Operation 302). For example, the system may identify previous selections by a task manager to modify a configuration of tasks to be performed among a set of work centers in a work environment. The task schedules may correspond to particular events—such as changes to tasks schedules when faults are detected in a work environment. The task schedules may further correspond to user selections to modify tasks schedules when no fault is detected. The task schedules may correspond to system generated recommendations for modifying tasks schedules. In addition, or in the alternative, the task schedules may correspond to user-initiated changes to task schedules, without computer-generated recommendations.

Once the various data (or subsets thereof) are identified in Operation 302, the system generates a set of training data (operation 304). Training data may include (a) a set of tasks assigned to a respective set of work centers, and (b) for each set of tasks, at least one label. Examples of labels include: whether the set of tasks was selected as an alternative to a previous task schedule, performance metrics associated with the set of tasks, a difference in performance metrics between a set of tasks arranged in an alternative task schedule and the set of tasks arranged in a source task schedule, and temporal information associated with the set of tasks (e.g., a beginning of a fiscal period, an end of a fiscal period, a particular month or season).

According to one embodiment, the system obtains the historical data and the training data set from a data repository storing labeled data sets. The training data set may be generated and updated by a work environment management platform. Alternatively, the training data set may be generated and maintained by a third party.

In some embodiments, generating the training data set includes generating a set of feature vectors for the labeled examples. A feature vector for an example may be n-dimensional, where n represents the number of features in the vector. The number of features that are selected may vary depending on the particular implementation. The features may be curated in a supervised approach or automatically selected from extracted attributes during model training and/or tuning. Example features include performance metrics for a set of tasks, whether a user selected the set of tasks as an alternative task schedule to a previously-scheduled set of tasks, whether the user selected the set of tasks in response to a recommendation generated subsequent to detecting a fault in a work environment, costs associated with the set of tasks, and differences between the attributes of a task schedules associated with a selected set of tasks (e.g., performance metrics and costs) and the attributes of a previous task schedule, where the selected set of tasks is based on modifying the previous task schedule. In some embodiments, a feature within a feature vector is represented numerically by one or more bits. The system may convert categorical attributes to numerical representations using an encoding scheme, such as one-hot encoding, label encoding, and binary encoding. One-hot encoding creates a unique binary feature for each possible category in an original feature. In one-hot encoding, when one feature has a value of 1, the remaining features have a value of 0. For example, if a task attribute has ten different categories, the system may generate ten different features of an input data set. When one category is present (e.g., value "1"), the remaining features are assigned a value "0." According to another example, the system may perform label encoding by assigning a unique numerical value to each category. According to yet another example, the system performs binary encoding by converting numerical values to binary digits and creating a new feature for each digit.

The system applies a machine learning algorithm to the training data set (Operation 306). The machine learning algorithm analyzes the training data set to identify data and patterns that indicate relationships between input features and selected task schedules. Types of machine learning models include, but are not limited to, linear regression, logistic regression, linear discriminant analysis, classification and regression trees, naïve Bayes, k-nearest neighbors, learning vector quantization, support vector machine, bagging and random forest, boosting, backpropagation, and/or clustering.

In some embodiments, the system iteratively applies the machine learning algorithm to a set of input data to generate an output set of labels, compares the generate labels to pre-generated labels associated with the input data, adjusts weights and offsets of the algorithm based on an error, and applies the algorithm to another set of input data.

In some embodiments, the system compares the labels estimated through the one or more iterations of the machine learning model algorithm with observed labels to determine an estimation error. The system may perform this comparison for a test set of examples, which may be a subset of examples in the training dataset that were not used to generate and fit the candidate models. The total estimation error for a particular iteration of the machine learning algorithm may be computed as a function of the magnitude of the difference and/or the number of examples for which the estimated label was wrongly predicted. In some embodiments, the system determines whether to adjust the weights and/or other model parameters based on the estimation error. Adjustments may be made until a candidate model that minimizes the estimation error or otherwise achieves a threshold level of estimation error is identified.

In some embodiments, the system selects machine learning model parameters based on the estimation error meeting a threshold accuracy level. For example, the system may select a set of parameter values for a machine learning model based on determining that the trained model has an accuracy level for predicting labels for task schedules of at least 98%.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. As previously mentioned, a given set of training data includes a task schedule and corresponding attributes (such as user selections, performance metrics, and costs). Each task schedule may be processed as a separate discrete instance of time. For instance, a data set may include task schedules $c_1$, $c_2$, and $c_3$ corresponding to times t, t+1, and t+2, respectively. Backpropagation through time may perform adjustments through gradient descent starting at time t+2 and moving backward in time to t+1 and then to t. Further, the backpropagation process may adjust the memory parameters of a cell such that a cell remembers contributions from previous expenses in the sequence of expenses. For example, a cell computing a contribution for $e_3$ may have a memory of the contribution of $e_2$, which has a memory of $e_1$. The memory may serve as a feedback connection such that the output of a cell at one time (e.g., t) is used as an input to the next time in the sequence (e.g., t+1). The gradient descent techniques may account for these feedback connections such that the contribution of set of tasks to a cell's output may affect the contribution of the set of tasks in the cell's output. Thus, the contribution of $c_1$ may affect the contribution of $c_2$, etc.

Additionally, or alternatively, the system may train other types of machine learning models. For example, the system may adjust the boundaries of a hyperplane in a support vector machine or node weights within a decision tree model to minimize estimation error. Once trained, the machine learning model may be used to estimate labels for new task schedules.

In examples of supervising ML algorithms, the system may obtain feedback on the whether a particular alternative task schedule should be presented to a user for a given set of work environment conditions (Operation 308). The feedback may affirm that a particular alternative task schedule should be presented to the user. In other examples, the feedback may indicate that a particular task schedule should not be presented to a user for a given set of conditions. Based on the feedback, the machine learning training set may be updated, thereby improving its analytical accuracy (Operation 310). Once updated, the system may further train the machine learning model by optionally applying the model to additional training data sets.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
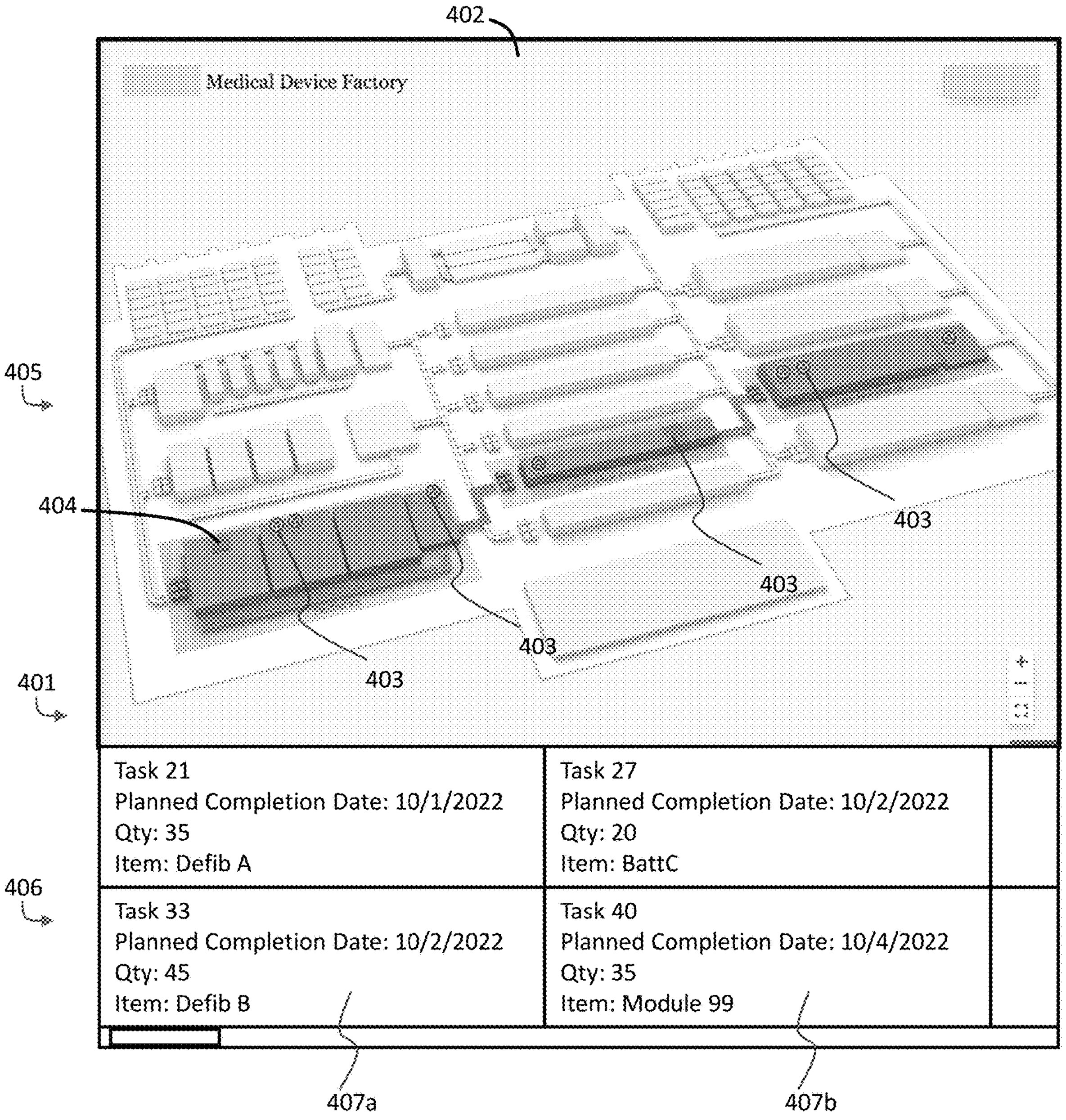
FIGS. 4A-4E illustrate an example set of graphical user interface (GUI) displays for generating and selecting recommendations for alternate task schedules in a work environment in accordance with one or more embodiments.

FIG. 4A illustrates a representation of manufacturing facility 402 displayed in a GUI 401. The representation of the manufacturing facility 402 includes icons 403 representing locations associated with tasks affected by a faulty piece of equipment 404. A system displays, in a first region 405 of the GUI 401, the representation of the facility 402. The system displays, in a second region 406 of the GUI 401, a set of icons representing tasks 407. Selection of an icon, such as icon 407*a*, causes the system to change the display in the GUI 401 to a Gantt chart, as illustrated in FIG. 4C.

Figure 4B:
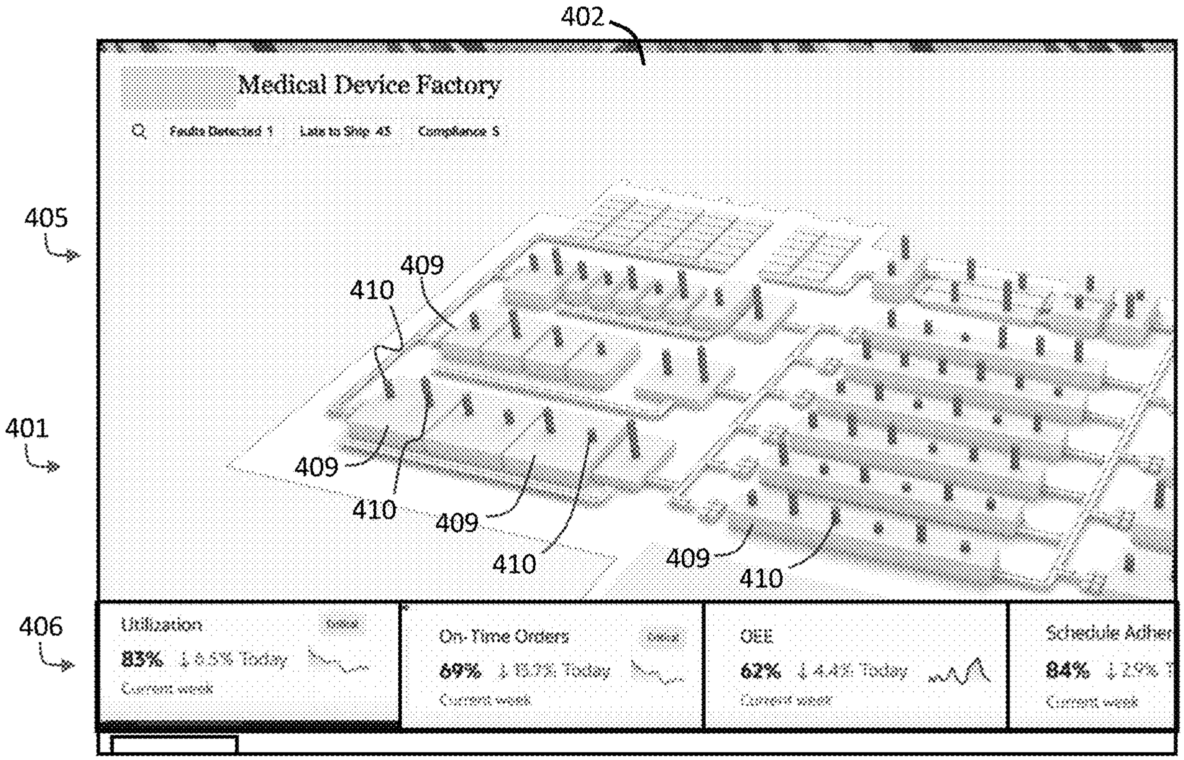
Figure 4C:
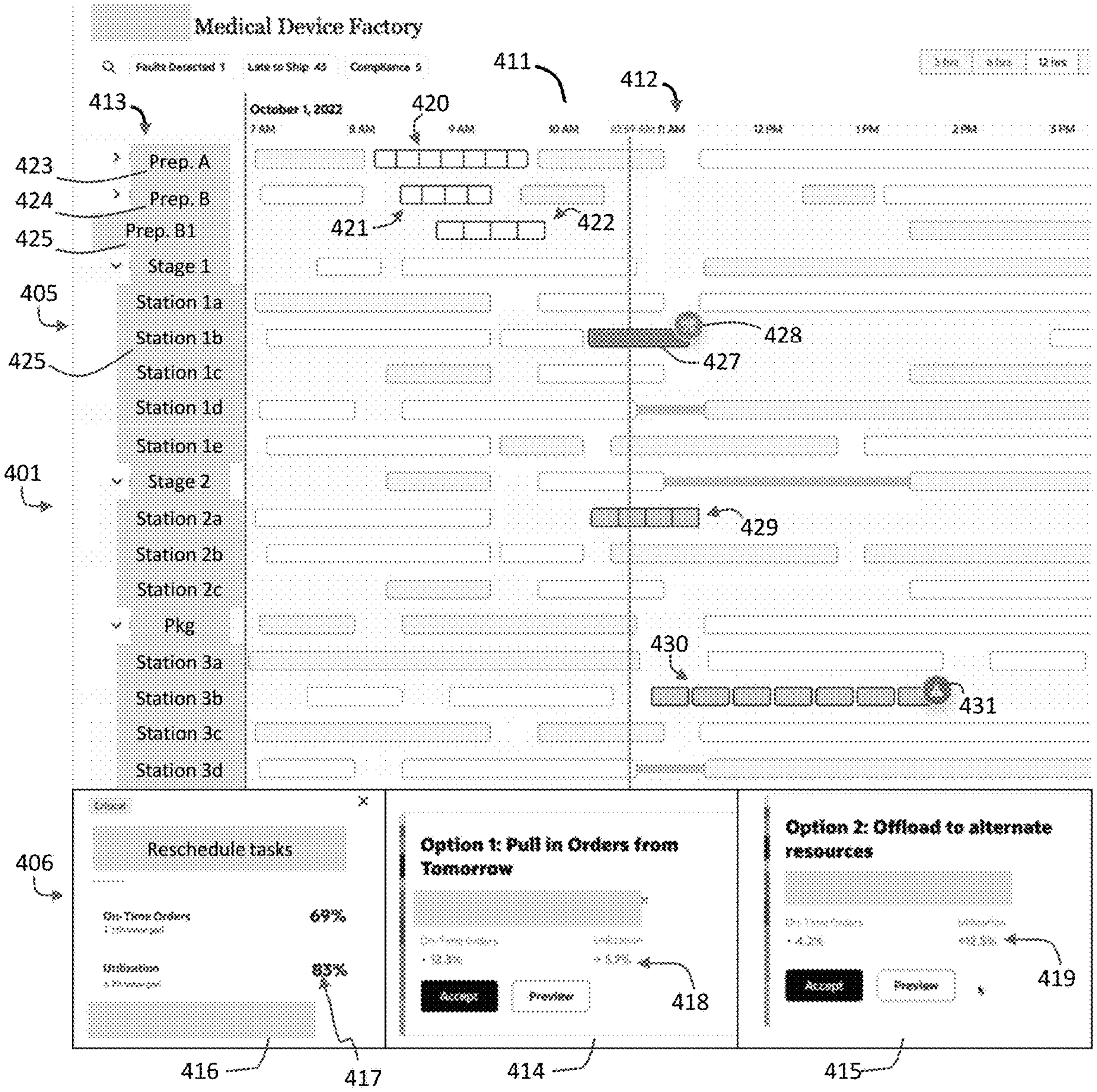

FIG. 4B illustrates a representation of the manufacturing facility 408 according to another embodiment. Instead of displaying a location of a piece of faulty equipment and affected tasks and locations, as illustrated in FIG. 4A, FIG. 4B illustrates a system overlaying onto representations of work centers 409 icons 410 representing performance metrics for the respective work centers 409. For example, the icons 410 may represent a utilization metric, an on-time metric, an equipment effectiveness metric, a quantity yield metric, a defects per unit metric, or a concatenation of any two or more metrics. The system displays the digital map of the manufacturing facility 408 in the first region 405 of the GUI 401. The system displays detail data, such as numerical statistics and trends, in the second region 406 of the GUI 401.

According to one example, selection of a particular work center 409 or performance metric icon 410 causes the system to modify the displayed user interface to display particular performance metrics associated with the selected work center 409. In addition, the system may display detailed statistics associated with particular operators assigned to work at the work center 409.

According to one or more embodiments, a system displays a Gantt chart illustrating a schedule of tasks to be performed among work centers in a work environment based on receiving a user selection of a work center 409 or performance metric icon 410 in FIG. 4B. FIG. 4C illustrates a Gantt chart 411 displayed in a GUI 401 including tasks 412 scheduled to be completed at work centers 413 within a facility. The chart 411 includes visual representations of tasks that are on-time, late, affected by faults in equipment, and rescheduled. For example, if performance of a task is affected by an equipment fault, the system may display the task in one color different from tasks that are unaffected by equipment fault.

The system generates recommendations for re-ordering scheduled tasks to improve completion times of one or more tasks. As illustrated in FIG. 4C, the system displays a Gantt chart 411 in the first region 405 of the GUI 401 and information associated with rescheduling tasks in the second region 406 of the GUI 401. For example, the system displays two tiles 414 and 415 in the second region of the GUI 401 corresponding to two options for rescheduling tasks to improve performance metrics. According to option 1 (tile 414), the system reschedules tasks by pulling in orders from another day. According to option 2 (tile 415), the system reschedules tasks by offloading tasks to alternate work centers. A user may select a tile associated with an option to see how the option would affect the scheduled tasks among all the work centers. In addition, the user may further customize the rescheduling of tasks by selecting and moving individual tasks and sets of tasks in the task scheduling display region (e.g., the first region 405) of the GUI 401.

As illustrated in FIG. 4C, a first information tile 416 in the second region of the GUI 401 displays current performance metrics 417 of the work environment. The system displays in the tiles 414 and 415 predicted performance metrics 418 and 419 associated with the respective options. For example, the system predicts option 1 (tile 414) would result in an increase of 12.3% percent of on-time orders, and an increase of 5.7% utilization. The system predicts option 2 (tile 415) would result in an increase of 4.2% on-time orders and an increase of 12.5% utilization. While FIG. 4C illustrates an example in which tiles 414 and 415 include a same set of performance metrics (i.e., on-time orders and utilization), in one or more embodiments, the system displays tiles with different performance metrics and/or with costs associated with implementing alternate task schedules.

In the example embodiment illustrated in FIG. 4C, task groups 420, 421, and 422 are performed at work centers 423, 424, and 425, respectively. The system determines that a fault in work center 426 would result in resources generated by task groups 420 and 422 being un-utilized. The system visually represents a maintenance task 427 to correct the fault in a different shade from on-time task groups and displays an icon 428 representing a fault and/or a maintenance operation. Selecting the icon 428 displays a window in the GUI 401 providing details about the maintenance task, including an estimated completion time and an individual or group responsible for performing the maintenance. Based on the fault and the resulting maintenance, the system determines that task groups 429 and 430 are unable to be performed as-scheduled. The system displays a warning icon 431 that a utilization performance metric and an on-time orders performance metric would not meet a predefined threshold.

According to the example embodiment illustrated in FIGS. 4A-4C, the system displays the tiles 414 and 415 with options for implementing alternative task schedules based on a user interaction with a representation of a manufacturing facility 402 or 408. However, according to an alternative embodiment, the system displays the tiles 414 and 415 with options for implementing alternative task schedules based on detecting a fault in a work environment. According to yet another embodiment, the system displays the tiles 414 and 415 based on calculating one or more performance metrics failing to meet a threshold, or based on predicting the one or more performance metrics will fail to meet the threshold within a certain period of time.

Figure 4D:
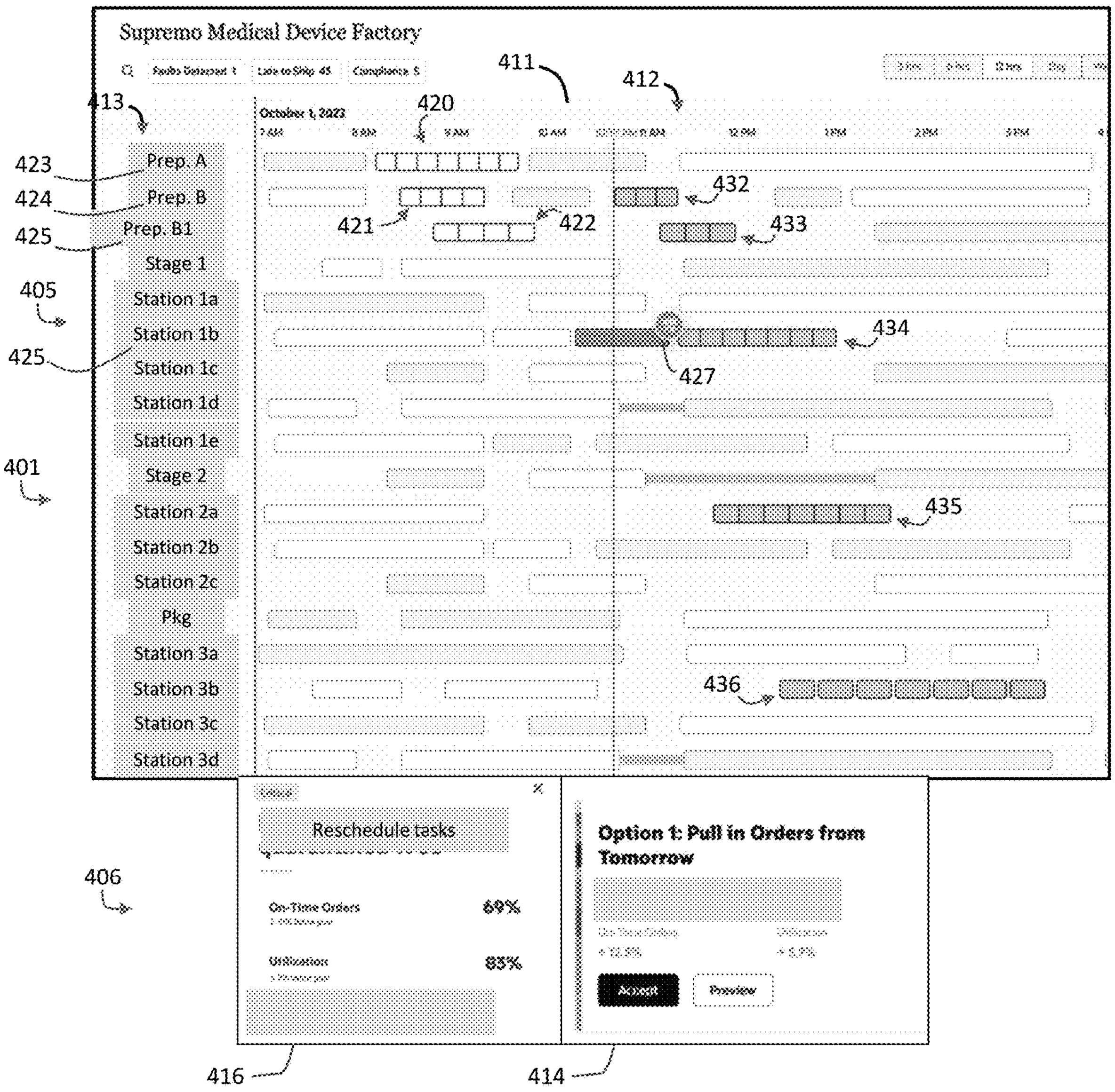
Figure 4E:
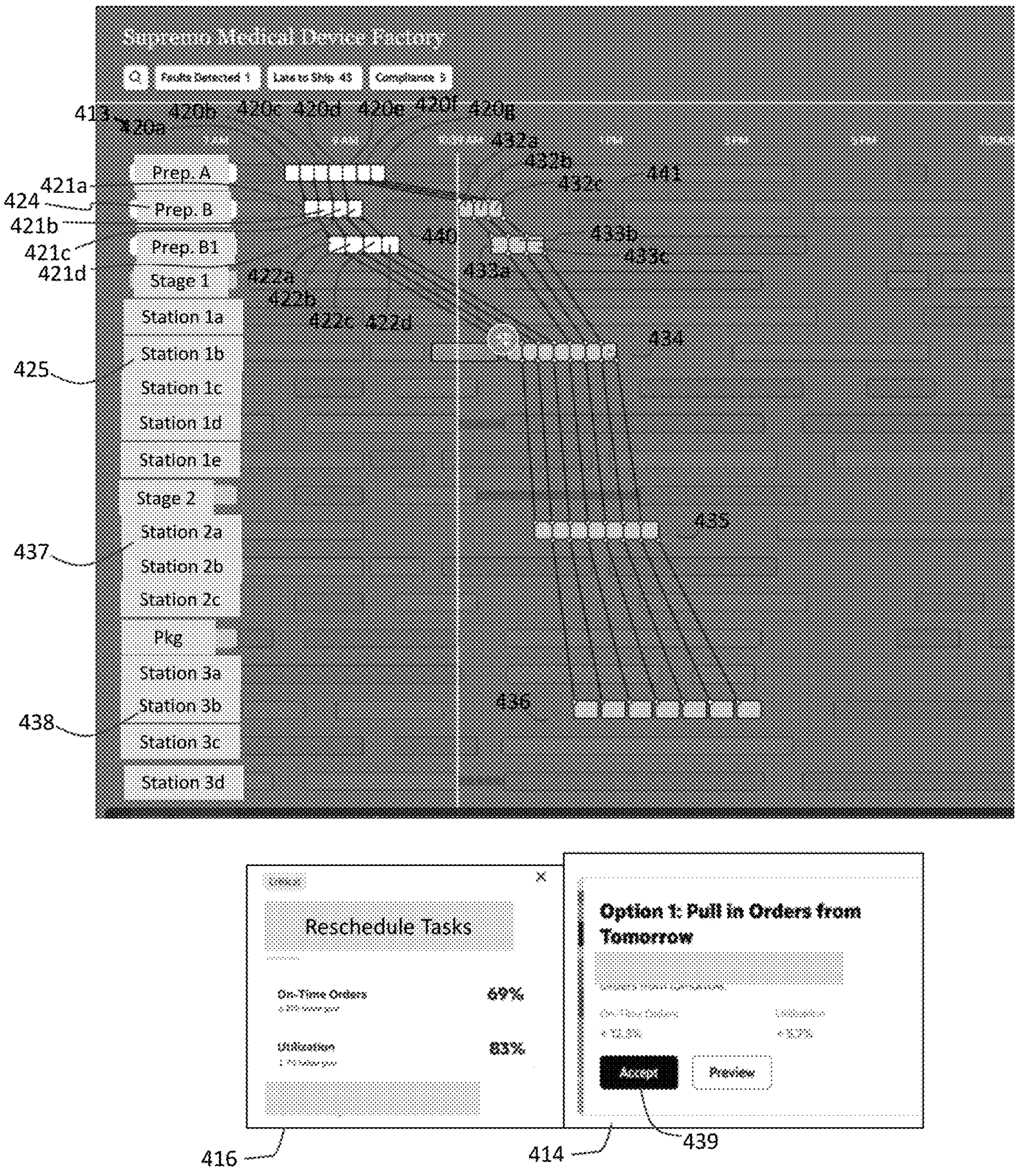

When a user selects a tile 414 associated with a recommended set of modifications to task schedules, the system modifies the display in the first region 405 of the GUI 401 to provide the user with a preview of the modification. As illustrated in FIG. 4D, the system displays task groups 432, 433, and 434, which correspond to tasks rescheduled from a next day to a currently-displayed day. Task group 435 corresponds to a set of tasks performed based on the products of task group 434. Task group 436 corresponds to a set of tasks performed based on products of task group 435. In the display of FIG. 3C, task group 436 was displayed in a manner to indicate the tasks in the task group 436 could not be performed due to the fault in work center 425. However, in FIG. 3D, the system displays the task group 436 in the GUI 401 with a color indicating the tasks are able to be completed.

If the system detects a user interaction with a highlighted task group (such as task groups 432, 433, 434, 435, or 436), the system changes the displayed task schedule to illustrate a relationship between tasks, as illustrated in FIG. 3E. In FIG. 3E, the system displays lines between tasks 420*a*-420*d* and tasks 421*a*-421*d*, indicating a product or result from tasks 420*a*-420*d* is provided to work center 424 to be used in tasks 421*a*-421*d*. Likewise, the system displays lines between tasks 421*a*-421*d* and tasks 422*a*-422*d*, indicating a product or result from tasks 421*a*-421*d* is provided to work center 425 to be used in tasks 422*a*-422*d*.

The system displays lines between tasks 420*e*-420*g* and recommended-rescheduled tasks 430*a*-430*c*, indicating a product or result from tasks 420*e*-420*g* is provided to work center 424 to be used in tasks 432*a*-432*c*. The system further illustrates how products or results from tasks in task groups 422 and 433 are provided to work center 425 to be used in tasks of the task group 434. Products or results from tasks in task group 434 are provided to work center 437 to be used in tasks of the task group 435. Products or results from tasks in task group 435 are provided to work center 438 to be used in tasks of the task group 436.

The system displays in the tile 414 in the GUI 401 a confirmation interface element 439. Based on detecting a user selection of the confirmation interface element, 439, the system generates instructions to terminals at the work centers 423, 424, 425, 437, and 438 to reschedule the tasks in the work environment. Rescheduling the tasks may include, for example: generating instructions to a materials mover to transfer materials to work center 423 earlier than previously scheduled, and modifying a set of tasks assigned to workers at work centers 423, 424, 425, 437, and 438. For example, prior to receiving a selection of an alternate task schedule, the system may display for a worker at terminal of the work center 424 a set of tasks including tasks in a task group 440 followed by tasks in a task group 441. Subsequent to receiving the selection to implement the alternate task schedule, the system modifies the sequence of tasks assigned to the worker at the terminal in the work center 424 to include tasks 432*a*-432*c* between the tasks of the task group 440 and the tasks of the task group 441.

6. Practical Applications, Advantages, and Improvements

In a complex physical facility in which multiple workers may work at multiple different work centers to perform a variety of tasks, determining how to prioritize the reordering of tasks involves complex permutations of possibilities than any user may be capable of calculating. For example, there may be multiple different ways to recover from a fault in a manufacturing process by reordering tasks that rely on faulty equipment. Each modification provides a different set of benefits and costs for different performance metrics. Embodiments apply a machine learning model to identify a subset of options, among many different candidates, for displaying in a GUI for a user. The machine learning model learns from past user selections and additional features, such as costs to perform modifications and benefits to different performance metrics, whether to display options for modifying task schedules, and how many options to display. In addition, the system allows a user to preview proposed modifications to task schedules and to implement the proposed modifications with a selection of an icon on a user interface.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as “hosts”) may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
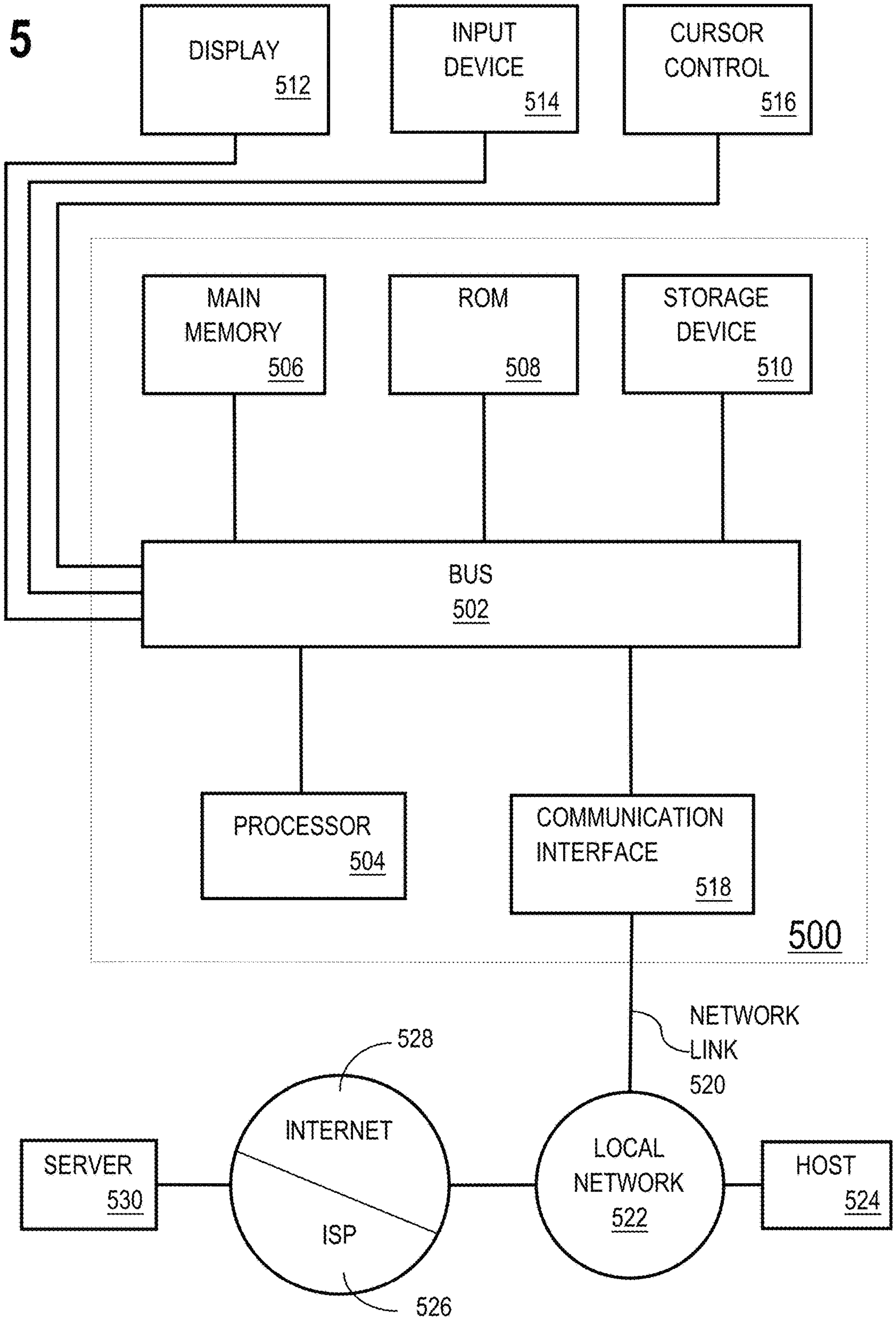
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

training a machine learning model to select alternate task schedules to recommend for implementation in a work environment based on a particular performance metric associated with a current task schedule implemented in the work environment, wherein training the machine learning model comprises:

accessing a set of historical training data comprising a set of historical task schedules and a set of historical task manager selections indicating, for each historical task schedule in the set of historical task schedules, whether the historical task schedule was selected for implementation in a respective work environment;

generating, from the set of historical training data, a set of feature vectors representing, for each historical task schedule, one or more of: a performance metric value associated with the historical task schedule, a cost associated with implementing the historical task schedule, a difference in performance metric values between the historical task schedule and a prior task schedule, and temporal data associated with the historical task manager selection; and applying a machine learning algorithm to the set of feature vectors to generate the machine learning model, wherein the machine learning model is configured to predict, for a particular candidate alternate task schedule, whether to include the particular candidate alternate task schedule among a particular subset of candidate alternate task schedules for display as selectable interface elements in a graphical user interface (GUI);

generating, in the GUI, a first digital representation of a first task schedule comprising a first configuration of a set of tasks to be performed at a plurality of work centers;

determining, by a work environment management platform, a first value for a first performance metric corresponding to the first task schedule, wherein the first performance metric specifies a qualitative measure of one or more characteristics associated with the first task schedule;

determining, by the work environment management platform, a second value for the first performance metric corresponding to a second task schedule comprising a second configuration of the set of tasks among the plurality of work centers;

determining that the second value is an improvement over the first value;

based on determining that the second value is the improvement over the first value, generating and implementing one or more machine-learning predictions for improving the first performance metric, at least by:

applying the machine learning model to a set of candidate alternate task schedules associated with a set of performance metric values and costs of the alternate task schedules, to select, from among the set of candidate alternate task schedules, a subset of candidate alternate task schedules to present as recommendations in the GUI concurrently with the first digital representation of the first task schedule, wherein the subset of candidate alternate task schedules includes a second candidate alternate task schedule associated with the second value for the first performance metric;

displaying in the GUI, concurrently with the first digital representation, a set of interface elements, wherein the set of interface elements displays the performance metric values corresponding to the subset of candidate alternate task schedules selected by the machine learning model, wherein each interface element in the set of interface elements corresponds to a respective candidate alternate task schedule from the subset of candidate alternate task schedules and is selectable, including a first user interface element displaying the second value for the first performance metric; and responsive to receiving a first selection corresponding to the first user interface element:

modifying, by the work environment management platform, the display of the GUI to generate a second digital representation of the second task schedule, wherein the second digital representation comprises one or more visual representations of one or more tasks that are modified relative to the first configuration of the set of tasks in the first digital representation.

2. The non-transitory computer readable medium of claim 1, wherein determining the second value for the first performance metric includes:

determining a first duration of time to complete a first subset of tasks at a first work center; and determining a second duration of time, different from the first duration of time, to complete the first subset of tasks at a second work center.

3. The non-transitory computer readable medium of claim 2, wherein the first digital representation includes a first set of icons representing the first subset of tasks performed by a first user at the first work center, wherein the second digital representation includes a second set of icons representing the first subset of tasks performed by a second user at the second work center, wherein the second set of icons is a different size than the first set of icons, and wherein a difference in size between the first set of icons and the second set of icons corresponds to a difference between the first duration of time and the second duration of time.

4. The non-transitory computer readable medium of claim 2, wherein determining the second duration of time is based on at least one of:

a qualification of a worker at the second work center;

an availability of materials to the second work center; and a configuration of a piece of equipment at the second work center.

5. The non-transitory computer readable medium of claim 1, wherein modifying the display of the GUI to generate the second digital representation of the second configuration of the set of tasks to be performed at the plurality of work centers comprises at least one of:

moving a particular digital representation of a particular task from a first region in the GUI representing one day to a second region in the GUI representing another day; and moving the particular digital representation of the particular task from a third region in the GUI representing one work center to a fourth region in the GUI representing another work center.

6. The non-transitory computer readable medium of claim 1, wherein the operations further comprise:

subsequent to generating the second digital representation, receiving a second selection; and responsive to receiving the second selection: transmitting a set of instructions to the plurality of work centers to implement the second configuration of the set of tasks.

7. The non-transitory computer readable medium of claim 6, wherein transmitting the set of instructions to a particular work center among the plurality of work centers causes a task display interface device to modify a set of tasks assigned to one or more users assigned to operate one or more machines at the particular work center.

8. The non-transitory computer readable medium of claim 1, wherein the operations further comprise:

detecting a fault at a particular work center among the plurality of work centers; and responsive to detecting the fault: determining the second value for the first performance metric corresponding to the second configuration of the set of tasks among the plurality of work centers, wherein the second configuration includes modifying a set of tasks assigned to the particular work center.

9. The non-transitory computer readable medium of claim 1, wherein the operations further comprise:

comparing the first value to a target value; and responsive to determining the first value does not meet the target value: determining the second value for the first performance metric corresponding to the second configuration of the set of tasks among the plurality of work centers.

10. The non-transitory computer readable medium of claim 1, wherein the operations further comprise:

determining a third value for a second performance metric corresponding to a third configuration of the set of tasks among the plurality of work centers;

generating, in the GUI and together with the first user interface element, a second user interface element displaying the third value for the second performance metric; and responsive to receiving a second selection corresponding to the second user interface element:

modifying the display of the GUI to generate a third digital representation of a third configuration of the set of tasks to be performed at the plurality of work centers.

11. The non-transitory computer readable medium of claim 1, wherein the operations further comprise:

monitoring a work environment comprising the plurality of work centers to determine a status of tasks performed at the plurality of work centers;

generating the first digital representation of the first task schedule based on at least the status of (a) a first subset of tasks completed at the plurality of work centers and (b) a second subset of tasks scheduled to be performed at the plurality of work centers.

12. The non-transitory computer readable medium of claim 1, wherein the operations further comprise:

monitoring the work environment comprising the plurality of work centers to determine a status of resources used to perform tasks at the plurality of work centers;

generating the first digital representation of the first task schedule based on at least the status of (a) a first subset of resources used to complete a first subset of tasks at the plurality of work centers and (b) a second subset of resources used to complete a second subset of tasks scheduled to be performed at the plurality of work centers.

13. The non-transitory computer readable medium of claim 12, wherein the operations further comprise:

based on the second digital representation of the second task schedule, reallocating at least the second subset of resources among the plurality of work centers.

14. A method comprising:

training a machine learning model to select alternate task schedules to recommend for implementation in a work environment based on a particular performance metric associated with a current task schedule implemented in the work environment, wherein training the machine learning model comprises:

accessing a set of historical training data comprising a set of historical task schedules and a set of historical task manager selections indicating, for each historical task schedule in the set of historical task schedules, whether the historical task schedule was selected for implementation in a respective work environment;

generating, from the set of historical training data, a set of feature vectors representing, for each historical task schedule, one or more of: a performance metric value associated with the historical task schedule, a cost associated with implementing the historical task schedule, a difference in performance metric values between the historical task schedule and a prior task schedule, and temporal data associated with the historical task manager selection; and applying a machine learning algorithm to the set of feature vectors to generate the machine learning model, wherein the machine learning model is configured to predict, for a particular candidate alternate task schedule, whether to include the particular candidate alternate task schedule among a particular subset of candidate alternate task schedules for display as selectable interface elements in a graphical user interface (GUI);

generating, in a graphical user interface (GUI) the GUI, a first digital representation of a first task schedule comprising a first configuration of a set of tasks to be performed at a plurality of work centers;

determining, by a work environment management platform, a first value for a first performance metric corresponding to the first task schedule, wherein the first performance metric specifies a qualitative measure of one or more characteristics associated with the first task schedule;

determining, by the work environment management platform, a second value for the first performance metric corresponding to a second task schedule comprising a second configuration of the set of tasks among the plurality of work centers;

determining that the second value is an improvement over the first value;

based on determining that the second value is the improvement over the first value, generating and implementing one or more machine-learning predictions for improving the first performance metric, at least by:

applying the machine learning model to a set of candidate alternate task schedules associated with a set of performance metric values and costs of the alternate task schedules, to select, from among the set of candidate alternate task schedules, a subset of candidate alternate task schedules to present as recommendations in the GUI concurrently with the first digital representation of the first task schedule, wherein the subset of candidate alternate task schedules includes a second candidate alternate task schedule associated with the second value for the first performance metric to generate a recommendation corresponding to a subset of the performance metric values, from among the set of performance metric values, wherein the set of performance metric values includes the second value for the first performance metric;

displaying in the GUI, concurrently with the first digital representation, a set of interface elements, wherein the set of interface elements displays the subset of the performance metric values corresponding to the subset of candidate alternate task schedules selected by the machine learning model, wherein each interface element in the set of interface elements corresponds to a respective candidate alternate task schedule from the subset of candidate alternate task schedules and is selectable, including a first user interface element displaying the second value for the first performance metric; and responsive to receiving a first selection corresponding to the first user interface element:

modifying, by the work environment management platform, the display of the GUI to generate a second digital representation of the second task schedule, wherein the second digital representation comprises one or more visual representations of one or more tasks that are modified relative to the first configuration of the set of tasks in the first digital representation.

15. The method of claim 14, wherein determining the second value for the first performance metric includes:

determining a first duration of time to complete a first subset of tasks at a first work center; and determining a second duration of time, different from the first duration of time, to complete the first subset of tasks at a second work center.

16. The method of claim 15, wherein the first digital representation includes a first set of icons representing the first subset of tasks performed by a first user at the first work center, wherein the second digital representation includes a second set of icons representing the first subset of tasks performed by a second user at the second work center, wherein the second set of icons is a different size than the first set of icons, and wherein a difference in size between the first set of icons and the second set of icons corresponds to a difference between the first duration of time and the second duration of time.

17. The method of claim 15, wherein determining the second duration of time is based on at least one of:
a qualification of a worker at the second work center;
an availability of materials to the second work center; and
a configuration of a piece of equipment at the second work center.

18. The method of claim 14, wherein modifying the display of the GUI to generate the second digital representation of the second configuration of the set of tasks to be performed at the plurality of work centers comprises at least one of:
moving a particular digital representation of a particular task from a first region in the GUI representing one day to a second region in the GUI representing another day; and
moving the particular digital representation of the particular task from a third region in the GUI representing one work center to a fourth region in the GUI representing another work center.

19. The method of claim 14, further comprising:
subsequent to generating the second digital representation, receiving a second selection; and
responsive to receiving the second selection: transmitting a set of instructions to the plurality of work centers to implement the second configuration of the set of tasks.

20. The method of claim 19, wherein transmitting the set of instructions to a particular work center among the plurality of work centers causes a task display interface device to modify a set of tasks assigned to one or more users assigned to operate one or more machines at the particular work center.

21. A system comprising:
one or more processors; and
memory storing instructions that, when executed by the one or more processors, cause the system to perform operations comprising:
training a machine learning model to select alternate task schedules to recommend for implementation in a work environment based on a particular performance metric associated with a current task schedule implemented in the work environment, wherein training the machine learning model comprises:
accessing a set of historical training data comprising a set of historical task schedules and a set of historical task manager selections indicating, for each historical task schedule in the set of historical task schedules, whether the historical task schedule was selected for implementation in a respective work environment;
generating, from the set of historical training data, a set of feature vectors representing, for each historical task schedule, one or more of: a performance metric value associated with the historical task schedule, a cost associated with implementing the historical task schedule, a difference in performance metric values between the historical task schedule and a prior task schedule, and temporal data associated with the historical task manager selection; and
applying a machine learning algorithm to the set of feature vectors to generate the machine learning model, wherein the machine learning model is configured to predict, for a particular candidate alternate task schedule, whether to include the particular candidate alternate task schedule among a particular subset of candidate alternate task schedules for display as selectable interface elements in a graphical user interface (GUI);
generating, in a graphical user interface (GUI) the GUI, a first digital representation of a first task schedule comprising a first configuration of a set of tasks to be performed at a plurality of work centers;
determining, by a work environment management platform, a first value for a first performance metric corresponding to the first task schedule, wherein the first performance metric specifies a qualitative measure of one or more characteristics associated with the first task schedule;
determining, by the work environment management platform, a second value for the first performance metric corresponding to a second task schedule comprising a second configuration of the set of tasks among the plurality of work centers;
determining that the second value is an improvement over the first value;
based on determining that the second value is the improvement over the first value, generating and implementing one or more machine-learning predictions for improving the first performance metric, at least by:
applying the machine learning model to a set of candidate alternate task schedules associated with a set of performance metric values and costs of the alternate task schedules, to select, from among the set of candidate alternate task schedules, a subset of candidate alternate task schedules to present as recommendations in the GUI concurrently with the first digital representation of the first task schedule, wherein the subset of candidate alternate task schedules includes a second candidate alternate task schedule associated with the second value for the first performance metric to generate a recommendation corresponding to a subset of the performance metric values, from among the set of performance metric values, wherein the set of performance metric values includes the second value for the first performance metric;
displaying in the GUI, concurrently with the first digital representation, a set of interface elements, wherein the set of interface elements displays the subset of the performance metric values corresponding to the subset of candidate alternate task schedules selected by the machine learning model, wherein each interface element in the set of interface elements corresponds to a respective candidate alternate task schedule from the subset of candidate alternate task schedules and is selectable, including a first user interface element displaying the second value for the first performance metric; and
responsive to receiving a first selection corresponding to the first user interface element:
modifying, by the work environment management platform, the display of the GUI to generate a second digital representation of the second task schedule, wherein the second digital representation comprises one or more visual representations of one or more tasks that are modified relative to the first configuration of the set of tasks in the first digital representation.

* * * * *